US011168881B2

(12) United States Patent
Lo et al.

(10) Patent No.: US 11,168,881 B2
(45) Date of Patent: Nov. 9, 2021

(54) LED LAMP STRUCTURE HAVING WATER TANKS, LENS MEMBER, AND SUPPORT MEANS

(71) Applicant: NAN YA PHOTONICS INCORPORATION, Taipei (TW)

(72) Inventors: Jung-Huang Lo, New Taipei (TW); Tung-Hsing Chou, New Taipei (TW); Yen-Yi Chen, New Taipei (TW); Tsung-Kun Yang, New Taipei (TW); Yi-Chih Yin, New Taipei (TW)

(73) Assignee: Nan Ya Photonics Incorporation, Taipei (TW)

( * ) Notice: Subject to any disclaimer, the term of this patent is extended or adjusted under 35 U.S.C. 154(b) by 0 days.

(21) Appl. No.: 17/032,502

(22) Filed: Sep. 25, 2020

(65) Prior Publication Data

US 2021/0140622 A1 May 13, 2021

(30) Foreign Application Priority Data

Nov. 8, 2019 (TW) ................................ 108140586
Nov. 8, 2019 (TW) ................................ 108214812
Nov. 8, 2019 (TW) ................................ 108214824

(51) Int. Cl.
*F21V 15/01* (2006.01)
*H02G 3/08* (2006.01)
*F21V 31/00* (2006.01)
*F21V 5/00* (2018.01)
*F21V 23/00* (2015.01)

(52) U.S. Cl.
CPC ................ *F21V 31/00* (2013.01); *F21V 5/00* (2013.01); *F21V 23/001* (2013.01); *F21V 23/003* (2013.01)

(58) Field of Classification Search
CPC ........ F21V 31/00; F21V 15/01; F21V 23/009; H02G 3/088; H02G 3/18
See application file for complete search history.

(56) References Cited

U.S. PATENT DOCUMENTS 1,909,404 A * 5/1933 Horn ...................... F21V 31/00 362/101
3,567,843 A * 3/1971 Collins ............... H02G 3/0616 174/51
5,088,015 A * 2/1992 Baggio .................. F21V 15/01 362/217.05

(Continued)

*Primary Examiner* — Ismael Negron
(74) *Attorney, Agent, or Firm* — Rosenberg, Klein & Lee

(57) ABSTRACT

A lamp structure includes top case, a bottom case coupled to the top case, a lamp shade coupled to the bottom case, and an LED base board provided between the lamp shade and bottom case. The top case includes a hollow member formed on a top surface, a projecting member inside the hollow member such that a first tank is defined between the hollow member and the first projecting member, a first elastic ring inside the first projecting member, and a first latch member inserted in the first projecting member and configured to press the first elastic ring. The bottom case includes a second projecting member configured to cooperate with an interior surface of the bottom case to define a second tank, a second elastic ring inside the second projecting member, and a second latch member inserted in the second projecting member and configured to press the second elastic ring.

6 Claims, 19 Drawing Sheets

(56) References Cited

U.S. PATENT DOCUMENTS

| | | | | |
|---|---|---|---|---|
| 5,848,836 | A * | 12/1998 | Graber | F21L 15/14<br>362/223 |
| 7,044,623 | B2 * | 5/2006 | Olsson | B63C 11/48<br>362/477 |
| 7,396,139 | B2 * | 7/2008 | Savage | B63B 45/02<br>362/101 |
| 7,722,216 | B2 * | 5/2010 | Amor | F21V 15/01<br>362/249.01 |
| 8,472,775 | B2 * | 6/2013 | Corbille | G02B 6/445<br>385/135 |
| 9,709,248 | B2 * | 7/2017 | Zhang | F21V 29/70 |
| 10,317,063 | B2 * | 6/2019 | Ott | F21V 25/12 |
| 10,422,492 | B2 * | 9/2019 | Xiang | F21V 15/01 |
| 2005/0254246 | A1 * | 11/2005 | Huang | H04N 5/2256<br>362/362 |
| 2007/0137544 | A1 * | 6/2007 | MacDonald | F21V 23/02<br>114/173 |

* cited by examiner

LED LAMP STRUCTURE HAVING WATER TANKS, LENS MEMBER, AND SUPPORT MEANS

FIELD OF THE INVENTION

The present invention relates generally to a lamp structure, and particularly to a lamp structure applicable to an environment with high safety standard.

BACKGROUND OF THE INVENTION

As the oil, chemical engineering, and mining industries are developed rapidly, the corresponding factory safety becomes more important. Considering frequent fire, power outage in factories, or even explosion, the safety standard of factory has become stricter. The danger of factory explosion is caused by explosive gas, dust, or erosion due to high humidity with sparks generated by electric power. Thereby, how to prevent explosion incidents caused by electricity leakage in a power transmission system has become a substantial subject in modern industry safety. To prevent electricity leakage in a power transmission system, the lighting system in factories has regarded as the regulation focus for factory safety.

Nowadays, lamps have been applied extensively to manufacturing, warehouses, and rescuing. The applications grow and the models vary increasingly. For example, in a steel mill, at leas 100 lamps are disposed on the ceilings. The lamps provide lighting to the operation space under the ceilings. To meet the requirements of factories, some lamps are designed to be hanged on the ceilings. For example, pipes are adopted to extend downward from the ceilings to connect with cables and installation covers, forming lamps suitable for factory environments.

In addition, due to the increasing strictness in the safety standard of factories as described above, in the lamp industry, lamp cases and installation covers are jointed hermetically for avoiding chippings or liquid from entering lamps. This kind of lamp is called an anti-explosion lamp. Being a kind of lamp adopted most extensively, its high protection effect has long appealed attention of factory builders or owners.

The anti-explosion lamp according to the prior art provides waterproof and anti-dust efficacies. It envelops wires in an installation pipe, which extends downward and passes through the opening on the installation cover of the lamp. Thereby, the wires can be connected to the internal electrical devices inside the lamp, such as light-emitting devices or electrical apparatuses, inside the lamp.

Unfortunately, due to various reasons, liquids, such as rains, leakage water from water pipes, or condensed liquids from air, still might enter the downward-extending installation pipes in the anti-explosion lamp according to the prior art. The liquids flow into the installation cover of the lamp through the downward-extending installation pipes. Once the liquids enter, it might fail the electrical devices (for example, light-emitting devices or electrical apparatuses). Even worse, it might generate sparks and lead to fire. Accordingly, it is required to avoid existence of liquids inside the pipes for preventing possible safety threats. Besides, the fixing structure in the anti-explosion lamp according to the prior art is usually designed in the way that the installation base must be disassembled while replacing the lamp. This design extends the installation time, making it extremely inconvenient. When the light of the lamp passes through lenses, the lenses of the lamp will accumulate heat, which results in thermal expansion and contraction. When the lenses expand owing to the heat, they will fall off from the lamp. Alternatively, when the lamp is shaken, the lenses will fall off. Consequently, the light emitted from the lamp cannot exhibit the expected performance. Moreover, it also induces concerns in the industrial safety. Thereby, the industry urges a lamp structure that can prevent liquids from entering the lamp via the pipes, solve the inconvenience in replacing the lamp, and reduce the risk of lens falloff by fixing the lenses to the lamp once the lamp thermally expands or contracts.

Accordingly, the present invention provides a lamp structure, which can prevent external liquids from entering the lamp along wires and hence avoiding risks in industrial safety caused by electrical leakage or sparks. In addition, the lamp can meet various installation requirements. When the lenses of the lamp thermally expand or contract, they still can be fixed to the lamp and hence reducing the risk of lens falloff.

SUMMARY

An objective of the present invention is to provide a lamp structure, which uses a top case and a bottom case. A hollow member and a projective member is disposed on the top case. A water tank is disposed between the hollow member and the projective member. Another projective member is disposed below the bottom case. Another water tank is disposed between the hollow member and the latter projective member. An elastic ring and a latch member is disposed on the inner side of the projective member. By using the latch member to press the top of the elastic ring, the diameter of the elastic ring is shortened and this squeezing the periphery of wires for preventing external liquids from entering the lamp along the wires. The blocked liquids are collected by the two water tanks.

Another objective of the present invention is to provide a lamp structure for solving the problem of waste in cost and time because the installation base must be replaced altogether while replacing the lamp according to the prior art.

A further objective of the present invention is to provide a lamp structure for solving the problem of inability of the installation base in applying to various scenarios owing to the simple structure of the installation base in the lamp structure according to the prior art.

To achieve the above objectives and efficacies, the present invention provides a lamp structure, which comprises a top case and a bottom case. A hollow member us disposed on the top case. A first projective member is disposed on an inner side of the hollow member. A first water tank is disposed between the first projective member and the hollow member. A first elastic ring is disposed on an inner side of the first projective member. A first latch member is inserted to the first projective member and presses the top of the first elastic ring. The first latch member includes a first penetrating hole communicating with a first hole of the first elastic ring. The bottom case is disposed below the top case. A second water tank is disposed between the top case and the bottom case and communicating with the first projective member. A second projective member is disposed on the top of the bottom case and located on an inner side of the second water tank. A second elastic ring is disposed on an inner side of the second projective member. A second latch member is inserted to the second projective member and presses the top of the second elastic ring. The second latch member includes a second penetrating hole communicating with the second water tank and a second hole of the second elastic ring. By using this structure, water and other liquids can be prevented from entering the lamp and hence avoiding risks in industrial safety caused by electrical leakage or sparks.

To achieve the above objectives, the present invention discloses a lamp structure, which comprises a top case and an installation base. The top case includes a first fixing member, an accommodating space, a base board, and one or more light-emitting device. The first fixing member extends upward along the top case and includes an external thread. A first opening is disposed on the first fixing member. The accommodating space is disposed inside the top case and communicates with the first opening. The base board is disposed inside the accommodating space. One end of a wire is connected to the base board and the other end thereof is connected to the first opening. The one or mode light-emitting device is disposed on the base board. The installation base is disposed on the top case and includes a second opening on one side. The installation base extends downward to form a second fixing member. The second fixing member includes an internal thread and a third opening. The third opening communicates with the second opening. When the internal thread is screwed to the external thread, the third opening communicates with the first opening; the wire passes through the second opening and the third opening and communicates with the base board for further securing the lamp structure.

According to an embodiment of the present invention, the lamp structure further comprises one or more light-emitting device and a lampshade. The one or more light-emitting device is disposed below the bottom case. The lampshade is disposed below the bottom case and above the one or more light-emitting device.

According to an embodiment of the present invention, a wire passes through the first penetrating hole and the first hole to the second water tank. Then the wire passes through the second penetrating hole and the second hole and is connected to the one or more light-emitting device.

According to an embodiment of the present invention, the lamp structure further comprises an electrical apparatus disposed on the top of the bottom case and located on one side of the second projective member.

According to an embodiment of the present invention, a waterproof washer is disposed between the top case and the bottom case.

According to an embodiment of the present invention, a first height of the hollow member is greater than a second height of the first projective member; and a third height of the bottom case is greater than a fourth height of the second projective member.

According to an embodiment of the present invention, a first fixing hole is disposed on the installation base.

According to an embodiment of the present invention, the lamp structure further comprises a fixing frame with a second fixing hole at the bottom and connected to the first fixing hole.

According to an embodiment of the present invention, the second fixing hole and the first fixing hole are connected via a bolt or a screw.

According to an embodiment of the present invention, a support arm is disposed on the second fixing member. One end of the support arm includes the second opening and extends along one side of the installation base to connect to an object.

According to an embodiment of the present invention, a third fixing member is disposed on the installation member and extends upward along the other side of the installation base. The third fixing member includes a third opening. The third opening is connected to a hanging pipe.

According to an embodiment of the present invention, a lampshade is disposed on the top case. The lampshade is disposed on the other side of the top case and located on an outer side of the one or more light-emitting device.

According to an embodiment of the present invention, a driving device is disposed on the top case. The driving device is disposed in the accommodating space and connected electrically to the wire and the base board.

According to an embodiment of the present invention, the lamp structure further comprises a second base board. The one or more first base board is disposed on the second base board.

According to an embodiment of the present invention, the lamp structure further comprises one or more light-emitting device disposed on and connected electrically to the second base board and located inside the one or more hole.

According to an embodiment of the present invention, the lamp structure further comprises one or more fixing hole and one or more fixing member. The fixing hole is disposed on the one or more first base board and extends to the second base board. The one or more fixing member is disposed inside the fixing hole.

According to an embodiment of the present invention, the one or more lens member forms a first angle with resect to the one or more first base board. When there are two sets of the one or more lens member, the two sets of the one or more lens member form the first angle and a second angle with respect to the one or more first base board, respectively.

DETAILED DESCRIPTION

In order to make the structure and characteristics as well as the effectiveness of the present invention to be further understood and recognized, the detailed description of the present invention is provided as follows along with embodiments and accompanying figures.

The present invention provides a lamp structure using a top case and a bottom case. A hollow member is disposed on the top of the top case. A first projective member is disposed inside the hollow member. A first elastic ring and a first latch member are then disposed inside the first projective member. The bottom case is disposed below the top case for forming a second water tank. A second projective member is disposed on the top of the bottom case. A second elastic ring and a second latch member are disposed inside the second projective member. By using the structure, external liquids can be prevented from entering the lamp.

Figure 1:
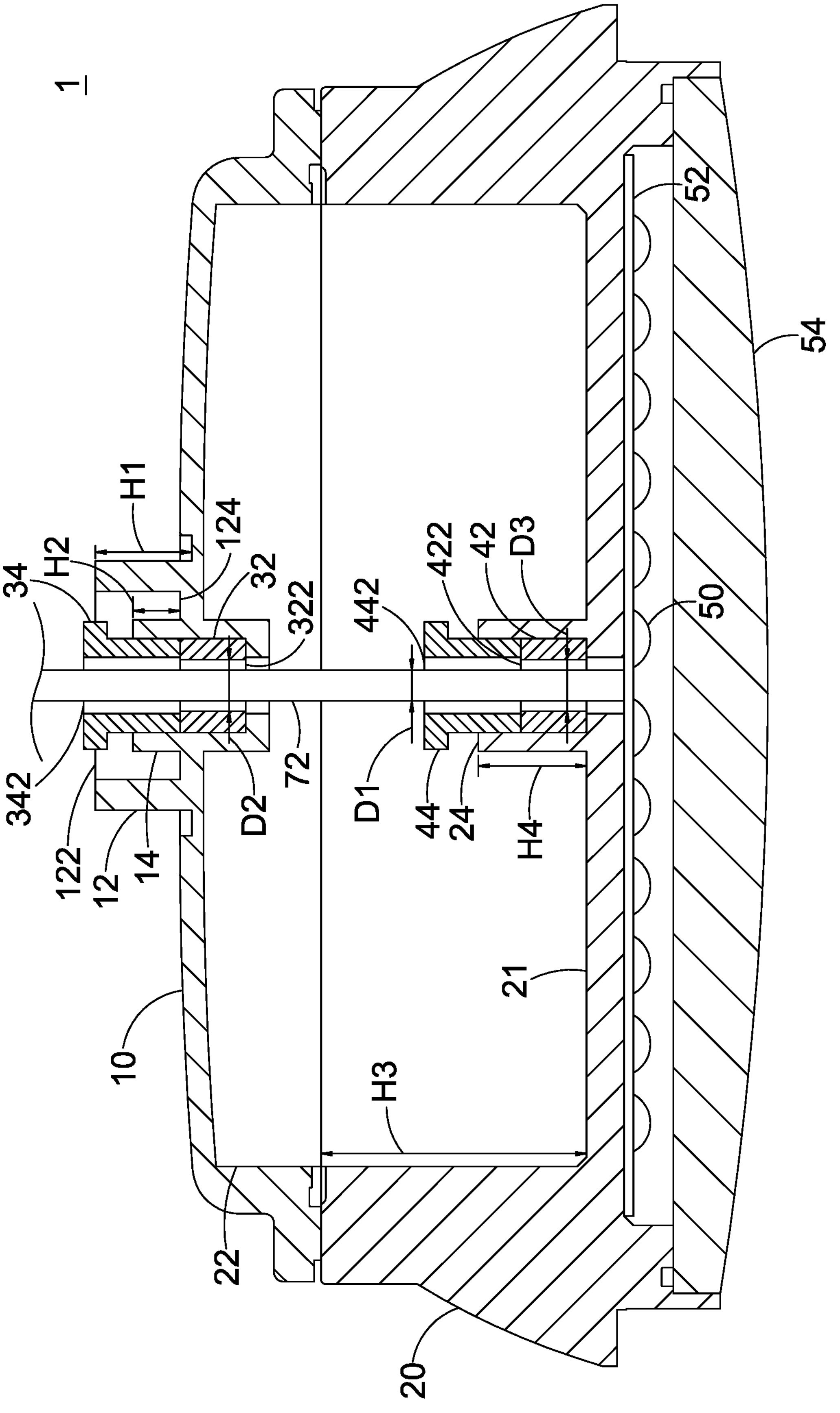
FIG. 1 shows a schematic diagram of the waterproof structure according to an embodiment of the present invention.

Please refer to FIG. 1, which shows a schematic diagram of the waterproof structure according to an embodiment of the present invention. As shown in the figure, a lamp structure 1 comprises a top case 10 and a bottom case 20. The bottom case 20 is disposed below the top case 10. By using a plurality of screws, the top case 10 and the bottom case 20 can be connected. Nonetheless, the present embodiment is not limited to using screws.

Please refer again to FIG. 1. As shown in the figure, the top case 10 includes a hollow member 12 and a first projective member 14 on the top. The hollow member 12 includes an opening 122 and can be installed to factory pipes or installation bases on ceilings. The first projective member 14 is disposed inside the hollow member 12. A first water tank 124 is disposed between the hollow member 12 and the first projective member 14. A first elastic ring 32 is disposed inside the first projective member 14. A first latch member 34 is inserted into the first projective member 14. The first latch member 34 presses the top of the first elastic ring 32. The first latch member 34 includes a first penetrating hole 342, which communicates with a first hole 322 of the first elastic ring 32 for wires or cables to pass through. A second water tank 21 is disposed between the top case 10 and the bottom case 20 and forming an accommodating space 22. The second water tank 21 communicates with first projective member 14. Namely, the second water tank 21 communicates with the first penetrating hole 342 and the first hole 322. A second projective member 24 is disposed on the top of the bottom case 20 and located inside the second water tank 21. A second elastic ring 42 is disposed inside the second projective member 24. A second latch member 44 is inserted into the second projective member 24. The second latch member 44 presses the top of the second elastic ring 42. The second latch member 44 includes a second penetrating hole 442, which communicates with the second water tank 21 and a second hole 422 of the second elastic ring 42. The first projective member 24 can project from the top case 10 into the accommodating space 22 formed by the second water tank 21. The location of the second projective member 24 can correspond to the location of the first projective member 14 for avoiding cracks on the surface of wires due to long-term distortion.

The hollow member 12 has a first height H1 measured from the bottom surface to the top surface; the first projective member 14 has a second height H2 measured from the bottom surface to the top surface. The first height H1 of the hollow member 12 is greater than the second height H2 of the first projective member 14 for preventing the first projective member from interfering the installation operations. The bottom case 20 has a third height H3 measured from the bottom surface to the top surface; the second projective member 24 has a fourth height H4 measured from the bottom surface to the top surface. The third height H3 of the bottom case 20 is greater than the fourth height H4 of the second projective member 24 for preventing a higher height of the second projective member 24 from influencing the installation and connection of the top and bottom cases 10, 20.

Next, the structure according to the above embodiment will be further described. The first water tank 124 disposed between the hollow member 12 and the first projective member 14 can accommodate liquids and prevent the liquids from entering the lamp. The second water tank 21 disposed between the bottom case 20 and the second projective member 24 can also accommodate liquids and prevent the liquids from flowing to the bottom of the lamp. An internal thread is disposed inside the first projective member 14; an external thread is disposed below the first latch member 34. The first latch member 34 is screwed to the first projective member 14. The first latch member 34 can move downward by rotation. Likewise, an internal thread is disposed inside the second projective member 24; an external thread is disposed below the second latch member 44. The second latch member 44 is screwed to the second projective member 24. The second latch member 34 can move downward by rotation. The material of the first latch member 34 and the material of the second latch member 44 are metals for their durability. The material of the first elastic ring 32 and the material of the second elastic ring 42 are selected from the group consisting of silica gel, rubber, resin, and plastics. Nonetheless, the present invention is not limited to the embodiment. Those materials that can make the first elastic ring 32 and the second elastic ring 42 elastic can be considered.

According to the present embodiment, the lamp structure further comprises one or more light-emitting device 50 (only one of them is labeled) and a lampshade 54. The one or more light-emitting device 50 is disposed below the bottom case 20 for providing light source. The one or more light-emitting device 50 includes a base board 52. The base board 52 of the one or more light-emitting device 50 is disposed on the bottom case 20. The lampshade 54 is a transparent element disposed below the bottom case 20 and on the top of the one or more light-emitting device 50. According to the present embodiment, the one or more light-emitting device 50 is a light-emitting diode.

The lamp structure according to the present embodiment further comprises a wire 72, which passes through the first penetrating hole 342 of the first latch member 34. Then, the wire 72 passes through the first hole 322 of the first elastic ring 32 to the accommodating space 22 formed by the second water tank 21 and through the second penetrating hole 442 of the second latch member 44. Finally, the wire 72 passes through the second hole 422 of the second elastic ring 42 and connects electrically to the base board 52 of the one or more light-emitting device 50.

Figure 2A:
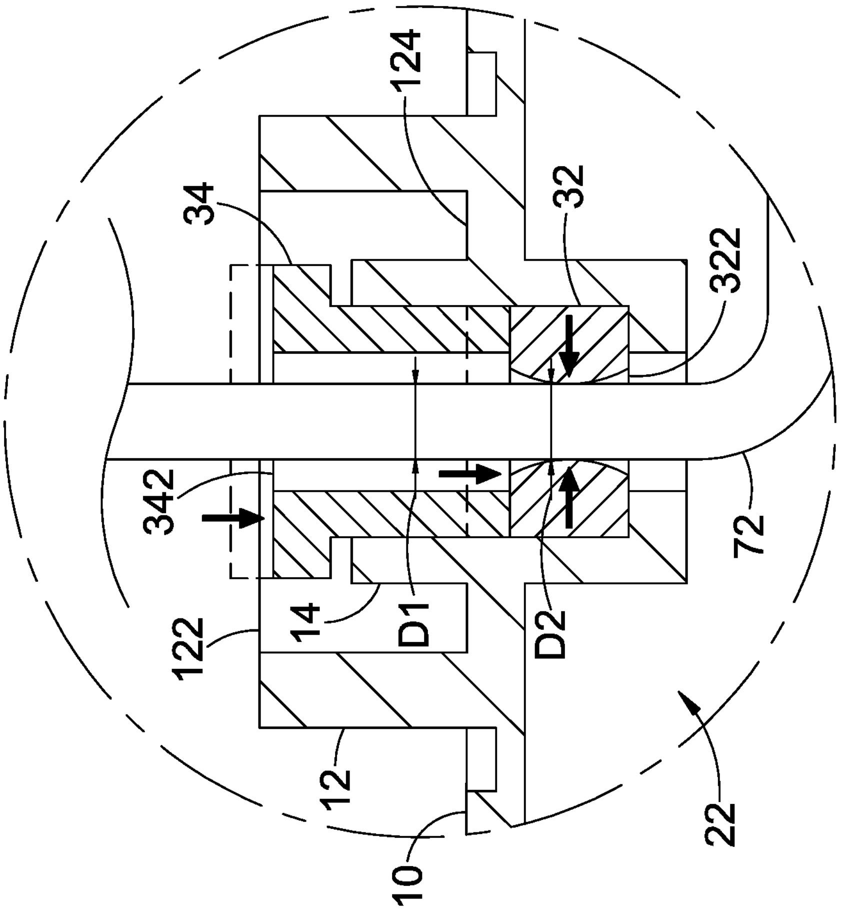
FIG. 2A to FIG. 2B show enlarged schematic diagrams of the waterproof structure according to an embodiment of the present invention.
Figure 2B:
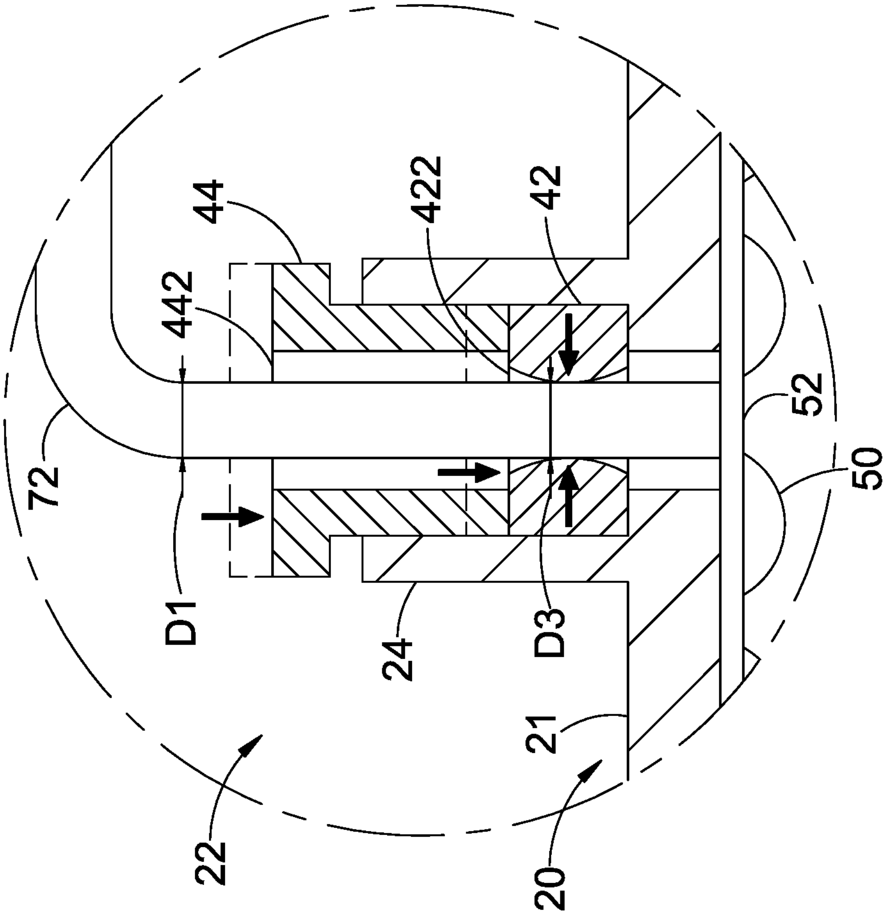

Please refer to FIG. 2A to FIG. 2B, which show enlarged schematic diagrams of the waterproof structure according to an embodiment of the present invention. FIG. 2A illustrates the enlarged view of the first projective member 14 and the surroundings; FIG. 2B illustrates the enlarged view of the second projective member 24 and the surroundings. According to the present embodiment, as shown in FIG. 2A, the wire 72 has an outer diameter D1, which is smaller than an inner diameter D2 of the first hole 322 of the first elastic ring 32. The wire 72 passes through the first penetrating hole 342 of the first latch member 34 and the first hole 322 of the first elastic ring 32. The first latch member 34 moves downward inside the first projective member 14 and concurrently squeezes the first elastic ring 32 below. The first elastic ring 32 is squeezed and deformed and thus shrinking the first hole 322. Then the inner diameter D2 becomes smaller than the outer diameter D1 of the wire 72. By squeezing the wire 72 using the first elastic ring 32, external liquids can be blocked from entering the accommodating space 22 and hence erosion of the components, such as electrical devices, in the accommodating space 22 can be prevented. As shown in FIG. 2B, the outer diameter D1 of the wire 72 is smaller than an inner diameter D3 of the second hole 422 of the second elastic ring 42. The wire 72 passes through the second penetrating hole 442 of the second latch member 44 and the second hole 422 of the second elastic ring 42. The second latch member 44 moves downward inside the second projective member 24 and concurrently squeezes the second elastic ring 42 below. The second elastic ring 42 is squeezed and deformed and thus shrinking the second hole 422. Then the inner diameter D3 becomes smaller than the outer diameter D1 of the wire 72. By squeezing the wire 72 using the second elastic ring 42, external liquids can be blocked from entering the light-emitting devices 50 and the base board 52.

The lamp structure according to the present embodiment comprises the top case 10 and the bottom case 20. The hollow member 12 and the first projective member 14 are disposed on the top case 10. The second projective below the bottom case 20. The first elastic ring 32 and the first latch member 34 are disposed inside the first projective member 14. By using the first latch member 34 to press the top of the first elastic ring 32, the inner diameter D2 of the first elastic ring 32 shrinks and squeezes the periphery of the wire 72, which prevents external liquids from entering the lamp along the wire 72. In addition, the first water tank 124 is used to collect the blocked liquids for avoiding them from eroding the first elastic ring 32 and the wire 72. According to the present embodiment, the second elastic ring 42 and the second latch member 44 are disposed inside the second projective member 24. By using the second latch member 44 to press the top of the second elastic ring 42, the inner diameter D3 of the second elastic ring 42 shrinks and squeezes the periphery of the wire 72, which blocks external liquids from contacting the light-emitting devices 50 along the wire 72. According to the present embodiment, two projective members work with the latch members and the elastic rings for improving the waterproof effect of the lamp structure 1. Compared to a single projective member, the lamp structure 1 according to the present embodiment has more protection. Once the liquids pass the guard of the first projective member 14 and enter the accommodating space 22, the protection by the second projective member 24 still can block the liquids within the second water tank 21 and avoid them from continue flowing downward and exiting the lamp.

Figure 3:
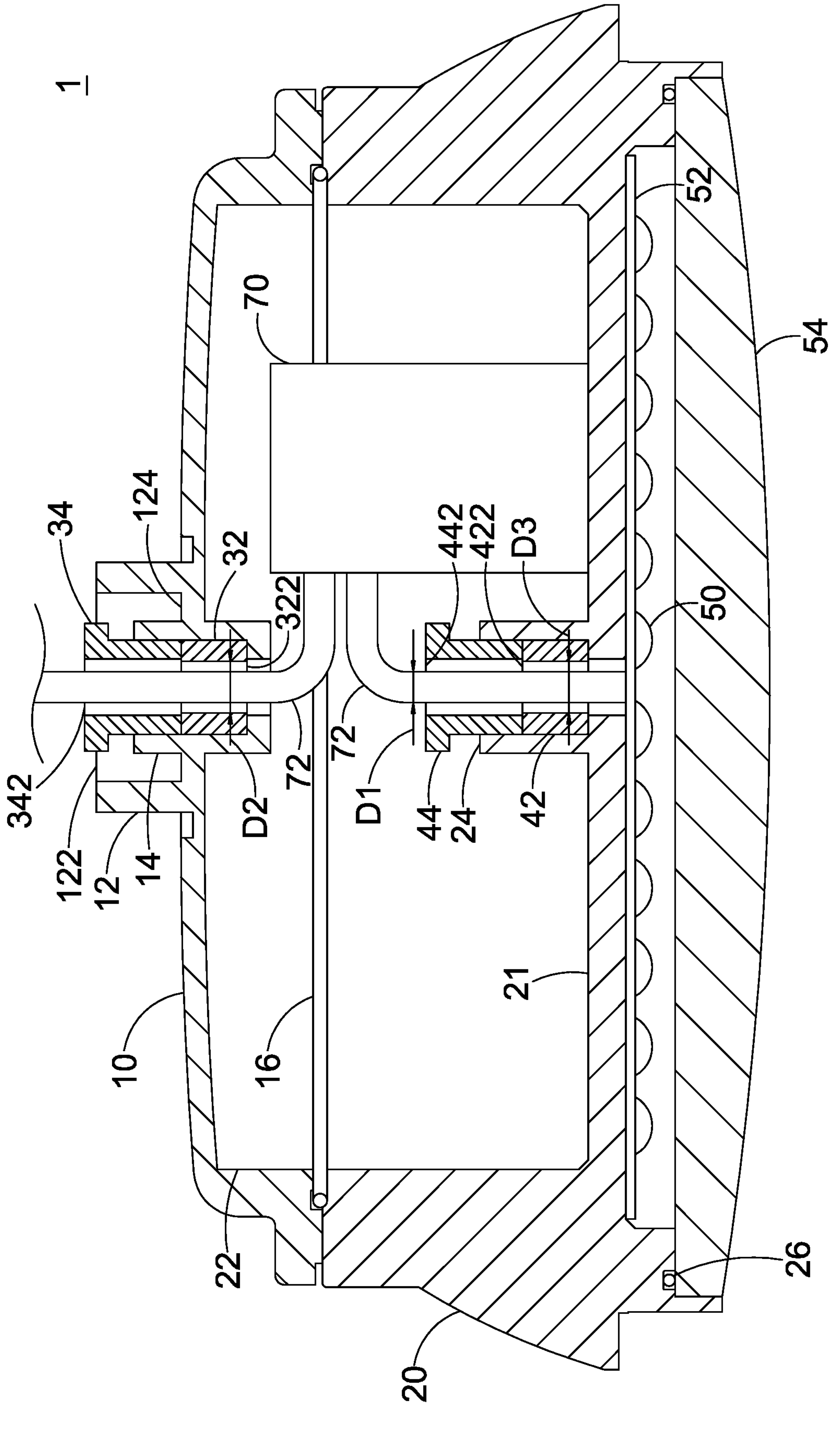
FIG. 3 shows a schematic diagram of the other structures according to an embodiment of the present invention.

Please refer to FIG. 3, which shows a schematic diagram of the other structures according to an embodiment of the present invention. As shown in the figure, the present embodiment is based on the structure according to the above embodiment. In addition, a waterproof washer 16 is disposed between the top case 10 and the bottom case 20 for avoiding liquids from contacting the light-emitting devices 50 and generating sparks or electrical leakage. A bottom waterproof washer 26 can be further disposed between the bottom case 20 and the lampshade 54 for avoiding liquids from entering the lamp. The other devices and connections according to the present embodiment are identical to the above embodiment. Hence, the details will not be repeated.

The lamp structure according to the present embodiment further comprises an electrical apparatus 70 disposed on the top of the top case 20 and located inside the second water tank 21 and one side of the second projective member 24. According to the present embodiment, the one or more light-emitting device 50 is a light-emitting diode. The electrical apparatus 70 can be the LED driving circuit according to the prior art for driving the one or more light-emitting device 50. Alternatively, the electrical apparatus 70 can be a rectifier that converting alternate current to direct current, such as a rectifying base board. Along the electrical connection path of the wire 72, the wire 72 can be connected electrical with the electrical apparatus 70. Then the electrical apparatus 70 can extend to complete the connection of the above embodiment. The details will not be repeated.

To sum up, the present invention provides a lamp structure, which uses the combination of the top case and the bottom case. A hollow member is disposed on the top of the top case. A first projective member is disposed inside the hollow member. Then a first elastic ring and a first latch member are disposed inside the first projective member. The lamp structure further comprises a water tank. The bottom case is disposed below the top case. The water tank is disposed between the top case and the bottom case. A second projective member is disposed on the bottom case. A second elastic ring and a second latch member are disposed inside the second projective member. By using the first and second latch members to press on the top of the first and second elastic rings, the diameters of the first and second elastic rings shrink to squeeze the periphery of the wire for preventing external liquids from entering the lamp along the wire and hence avoiding risks in industrial safety caused by electrical leakage or sparks. Besides, two water tanks are adopted to collect the blocked liquids.

Figure 4:
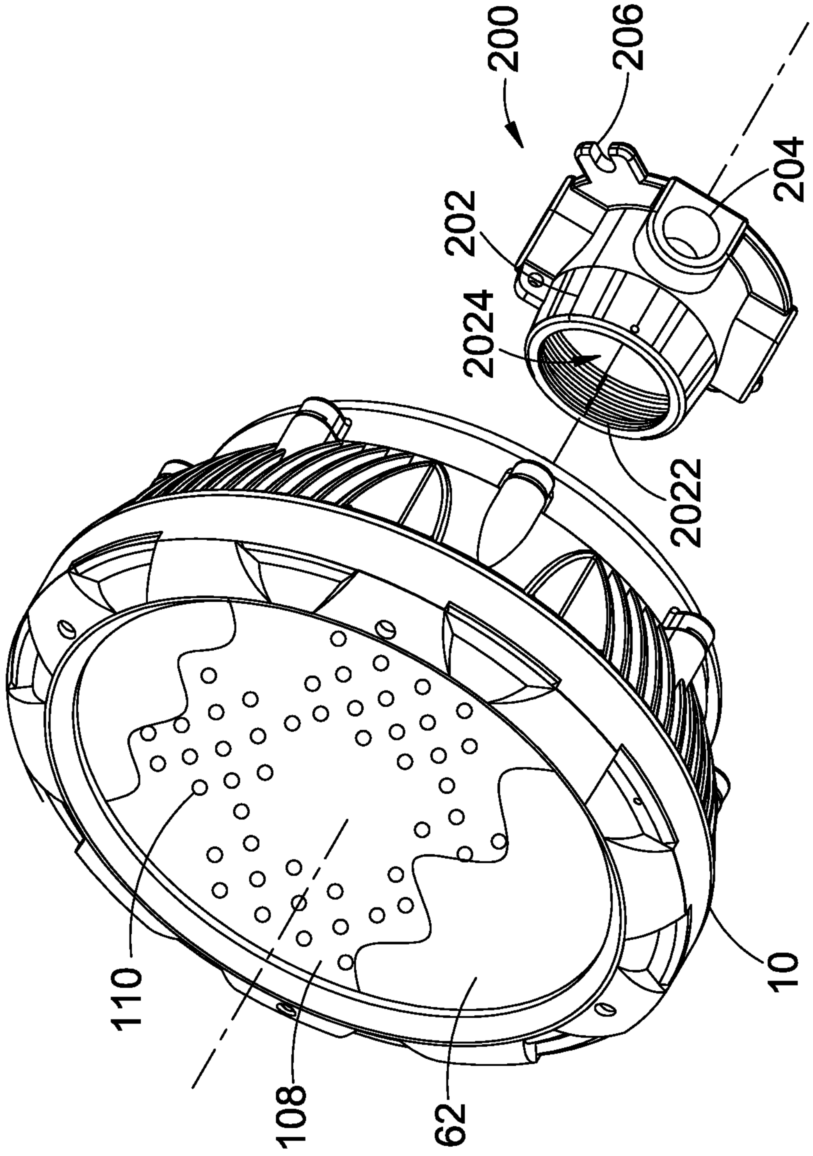
FIG. 4 shows a schematic diagram of the fixing structure according to an embodiment of the present invention.
Figure 5A:
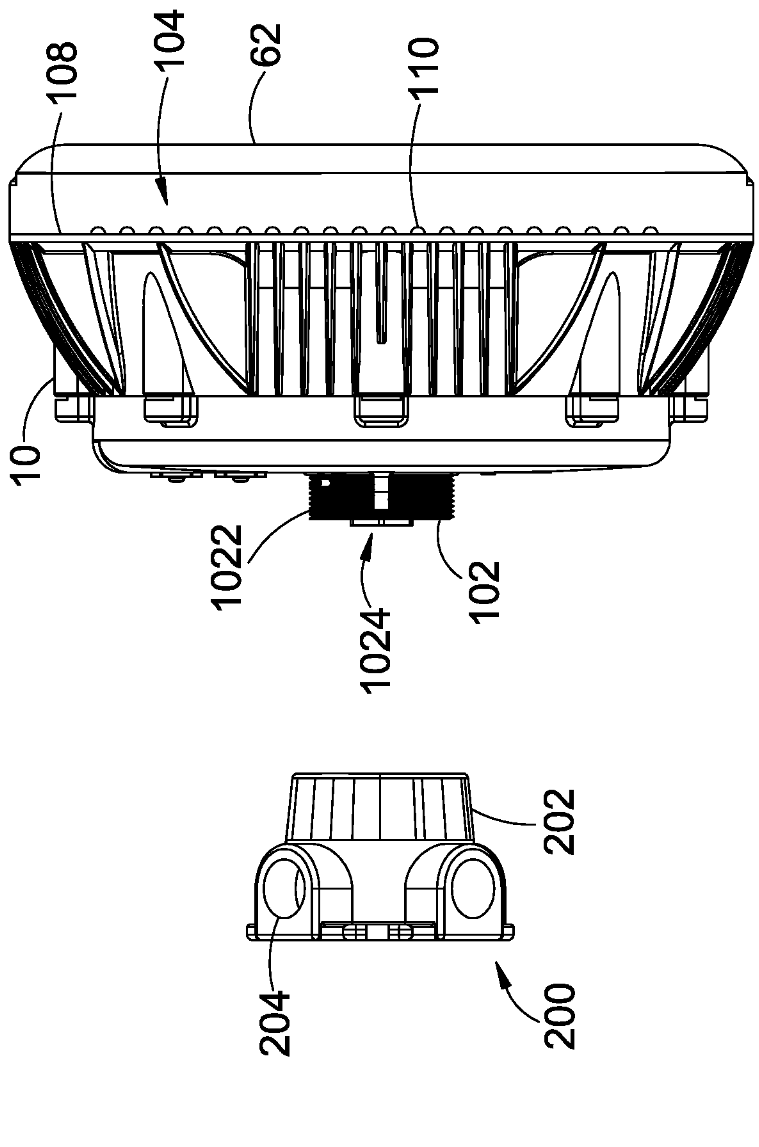
FIG. 5A shows a side view of the fixing structure according to an embodiment of the present invention.
Figure 5B:
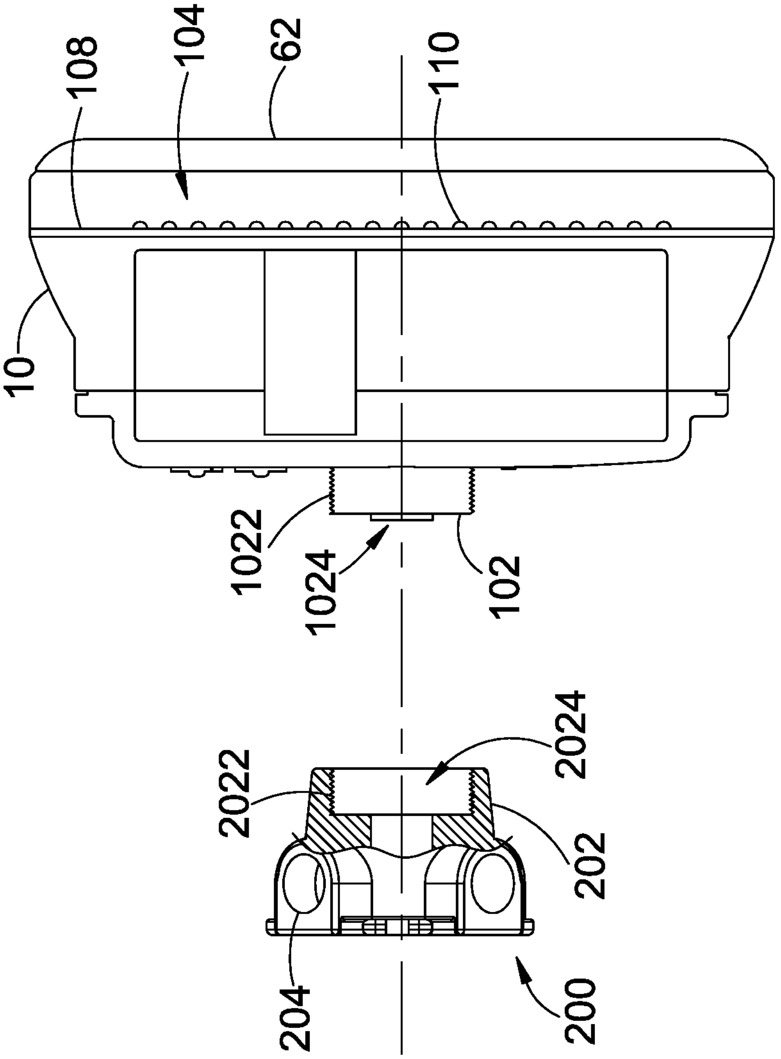
FIG. 5B shows a side cross-sectional view of the fixing structure according to an embodiment of the present invention.

Please refer to FIG. 4, FIG. 5A, and FIG. 5B. FIG. 4 shows a schematic diagram of the fixing structure according to an embodiment of the present invention. FIG. 5A shows a side view of the fixing structure according to an embodiment of the present invention. FIG. 5B shows a side cross-sectional view of the fixing structure according to an embodiment of the present invention. As shown in the figures, according to the present embodiment, the lamp structure according to the present invention comprises a top case 10 and an installation base 200. The top case 10 includes a first fixing member 102, an accommodating space 104, a base board 108, and one or more light-emitting device 50. The first fixing member 102 extends upward along the top case 10 and includes an external thread 1022. A first opening 1024 is disposed on the first fixing member 102. The accommodating space 104 is disposed in the top case 10 and communicates with the first opening 1024. The base board 108 is disposed in the accommodating space 104. The one or more light-emitting device 50 is disposed on the base board 108. The installation base 200 is disposed on the top case 10 and includes a second opening 204 on one side. The installation base 200 extends downward to from a second fixing member 202. The second fixing member 202 includes an internal thread 2022 and a third opening 2024. The third opening 2024 communicates with the second opening 204. The internal thread 2022 is screwed to the external thread 1022.

Figure 6A:
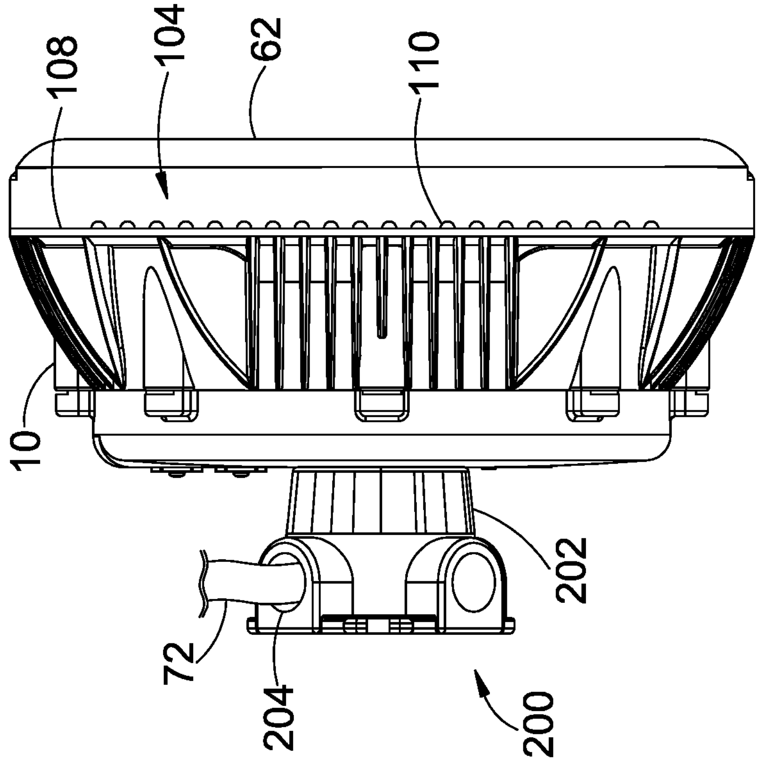
FIG. 6A shows a side view of installing the fixing structure according to an embodiment of the present invention.
Figure 6B:
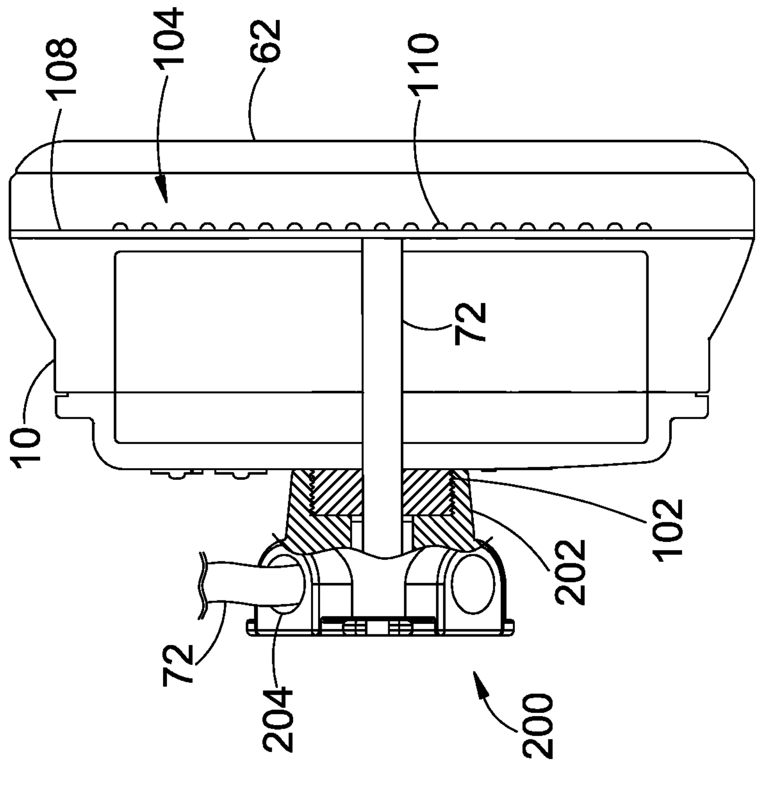
FIG. 6B shows a side cross-sectional view of installing the fixing structure according to an embodiment of the present invention.

Please refer to FIG. 4, FIG. 5A, FIG. 5B, FIG. 6A, and FIG. 6B. FIG. 6A shows a side view of installing the fixing structure according to an embodiment of the present invention. FIG. 6B shows a side cross-sectional view of installing the fixing structure according to an embodiment of the present invention. As shown in the figures, one end of a wire 72 is connected to the base board 108. The base board 108 is identical the base board 52 described in the above embodiment. The other end of the wire 72 passes through the first opening 1024. When the internal thread 2022 is screwed to the external thread 1022, the third opening 2024 communicates the first opening 1024; the wire 72 passes through the third opening 2024 and the second opening 204 and extends to the external power source. The above structure enables the lamp to be installed more stably. To replace the lamp, just disassemble the lamp and replace it. It is not required to disassemble the installation base 200. Thereby, the replacement becomes more convenient and hence saving costs.

Please refer again to FIG. 4. As shown in the figure, a lampshade 62 is disposed on the other side of the top case 10 and located on the outer side of the one or more light-emitting device 110. The material of the lampshade 62 is selected form anti-explosion materials for further protecting the one or more light-emitting device 110 and the internal structure. The lampshade 62 is identical the lampshade 54 described in the above embodiment.

Figure 6C:
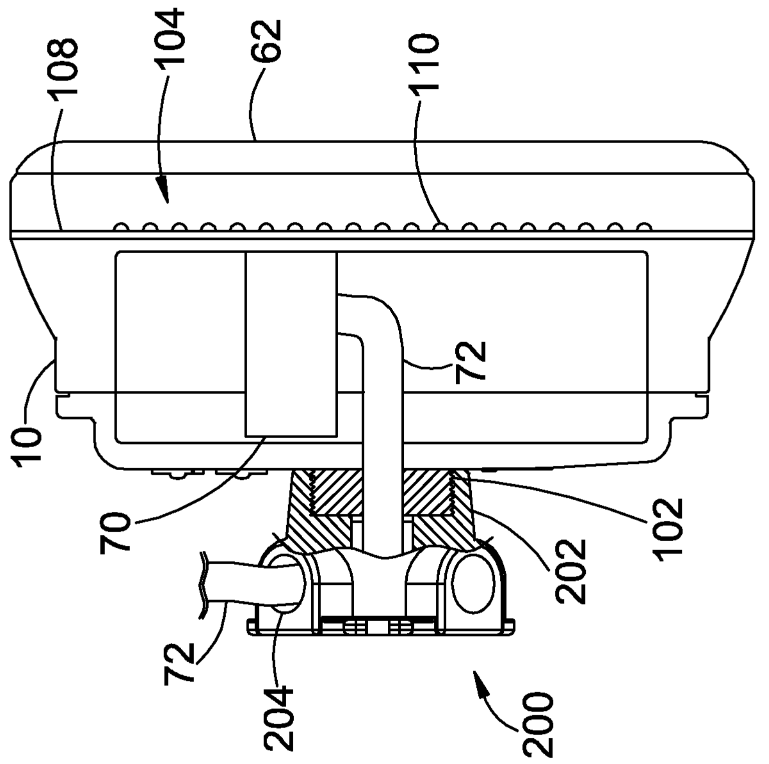
FIG. 6C shows a side cross-sectional view of the other elements the fixing structure according to an embodiment of the present invention.
Figure 7:
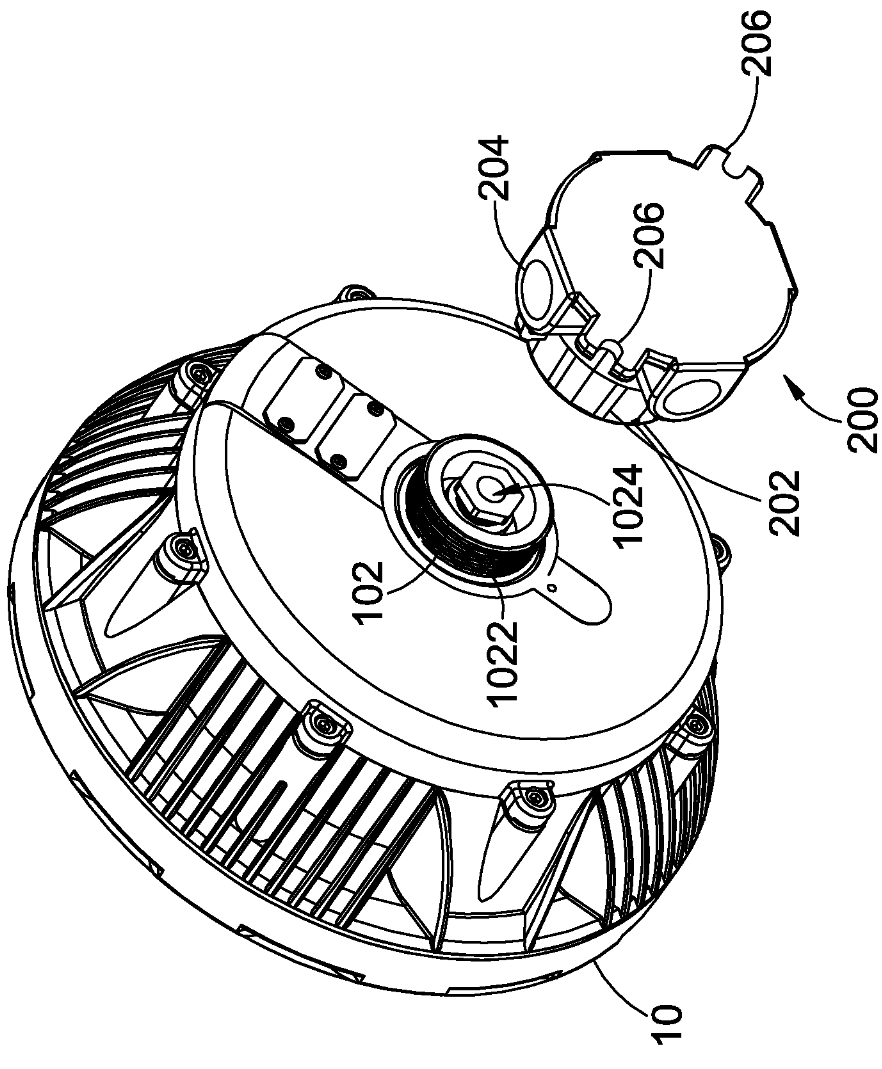
FIG. 7 shows a schematic diagram of the fixing structure according to the first embodiment of the present invention.

Please refer again to FIG. 4 and FIG. 5B, as well as to FIG. 6C and FIG. 7. FIG. 6C shows a side cross-sectional view of the other elements the fixing structure according to an embodiment of the present invention. FIG. 7 shows a schematic diagram of the fixing structure according to the first embodiment of the present invention. As shown in the figures, according to the present embodiment, one end of the wire 72 is connected to the driving device 106. The driving device 106 is connected to the base board 108. The other end of the wire 72 passes through the first opening 1024, and extends to pass through the third opening 2024 and the second opening 204 and then to the external power source. A first fixing hole 206 is disposed on the installation base 200. The first fixing hole 206 is used to install to the ceiling of the top structure of a house. A plurality of first fixing holes 206 can be disposed. Nonetheless, the present invention does not limit the number of the first fixing holes 206. The installation base 200 is first installed to the ceiling or the top structure of a house. Next, the external thread 1022 is disposed to the internal thread 2022 by screwing for fixing and installing the lamp. The above structure makes the lamp to be fixed more stably, as well as enabling convenience in replacement.

Figure 8:
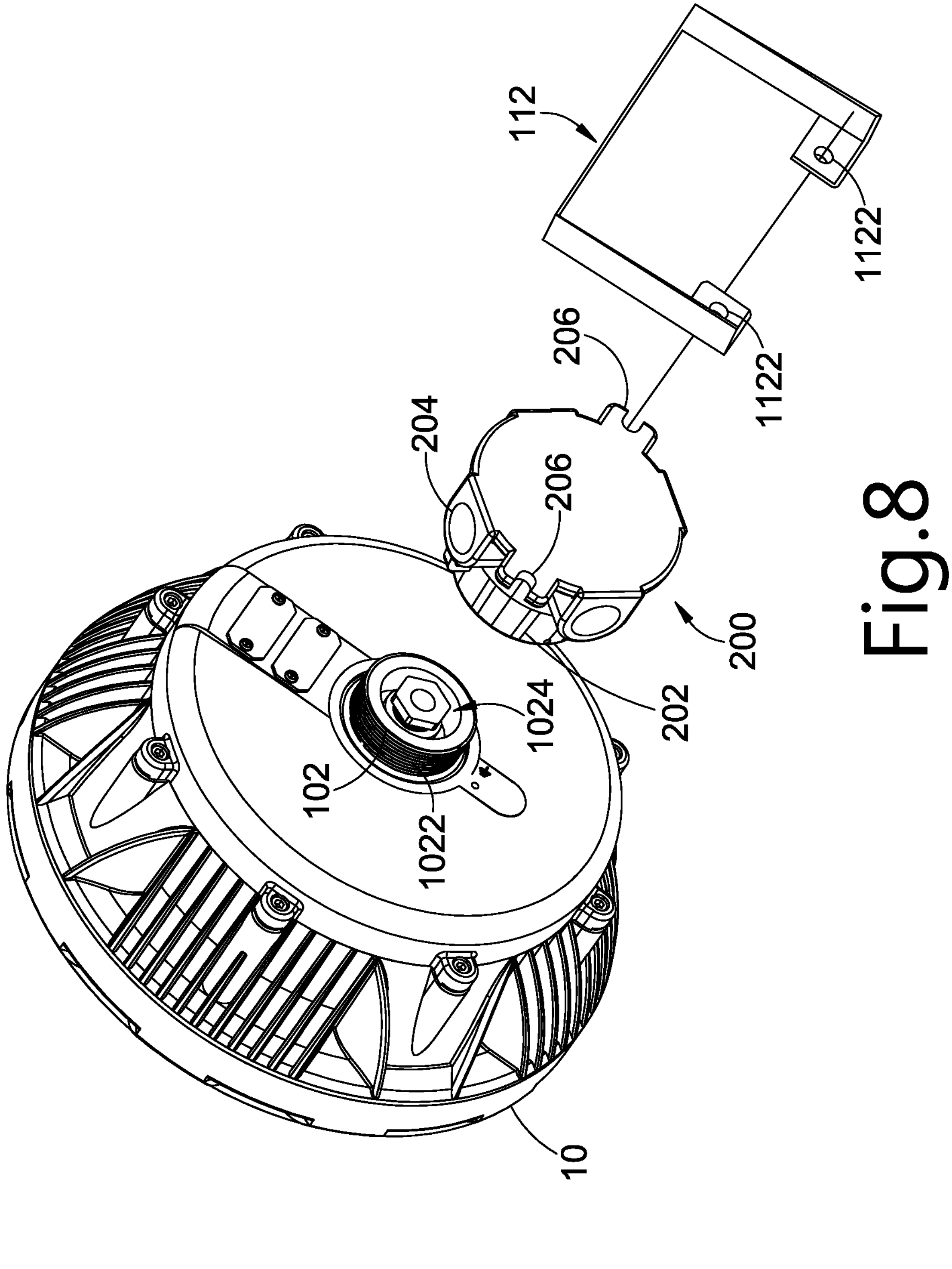
FIG. 8 shows a schematic diagram of the fixing structure according to the second embodiment of the present invention.

Please refer again to FIG. 4, as well as referring to FIG. 8. FIG. 8 shows a schematic diagram of the fixing structure according to the second embodiment of the present invention. As shown in the figures, according to the present embodiment, the lamp structure further comprises a fixing frame 112. A second fixing hole 1122 is disposed at the bottom of the fixing frame 112. The second fixing hole 1122 is connected to the first fixing hole 206 by bolts or screws. In the installation process, one side of the fixing frame 112 is first installed to a wall or an object. Next, use bolts or screws to fix the first fixing hole 206 of the installation base 200 to the second fixing hole. Then, the external thread 1022 is disposed to the internal thread 2022 by screwing for fixing and installing the lamp. The present invention can meet different installation requirements and realize installation at different angles. The other structures according to the present embodiment are basically identical to those according to the first embodiment. Hence, the details will not be described again.

Figure 9:
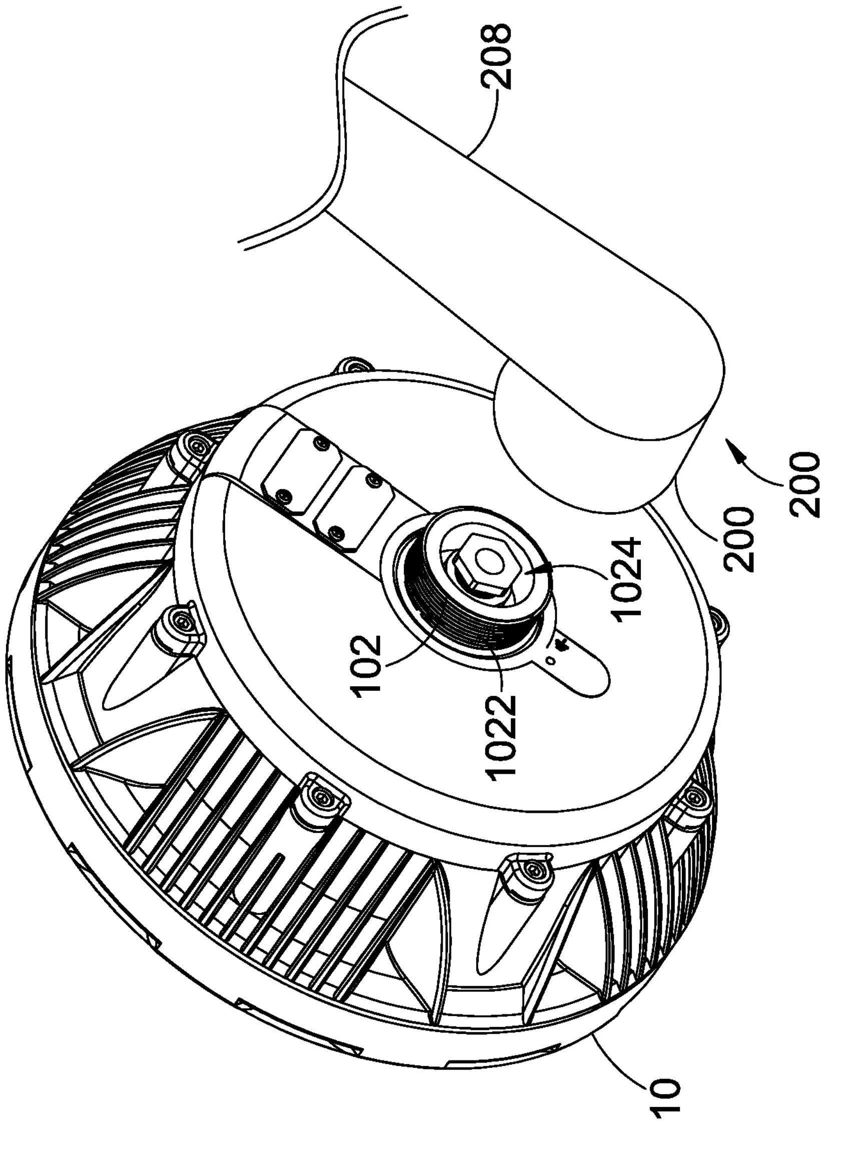
FIG. 9 shows a schematic diagram of the fixing structure according to the third embodiment of the present invention.

Please refer again to FIG. 4, as well as referring to FIG. 9. FIG. 9 shows a schematic diagram of the fixing structure according to the third embodiment of the present invention. As shown in the figures, according to the present embodiment, a support arm 208 is disposed on the second fixing member 202. The second opening 204 is disposed on the support arm 208. The second opening 204 communicates with the third opening 2024. The support arm 208 extends along one side of the installation base 200 with one end connected to an object (not shown in the figures). The wire 72 passes through the second opening 204 and is connected to the object. IN the installation process, the support arm 208 of the installation base 200 is first disposed to the object. Next, the external thread 1022 is disposed to the internal thread 2022 by screwing for fixing and installing the lamp. The present invention can meet different installation requirements and realize supporting of lamps. The other structures according to the present embodiment are basically identical to those according to the first embodiment. Hence, the details will not be described again.

Figure 10:
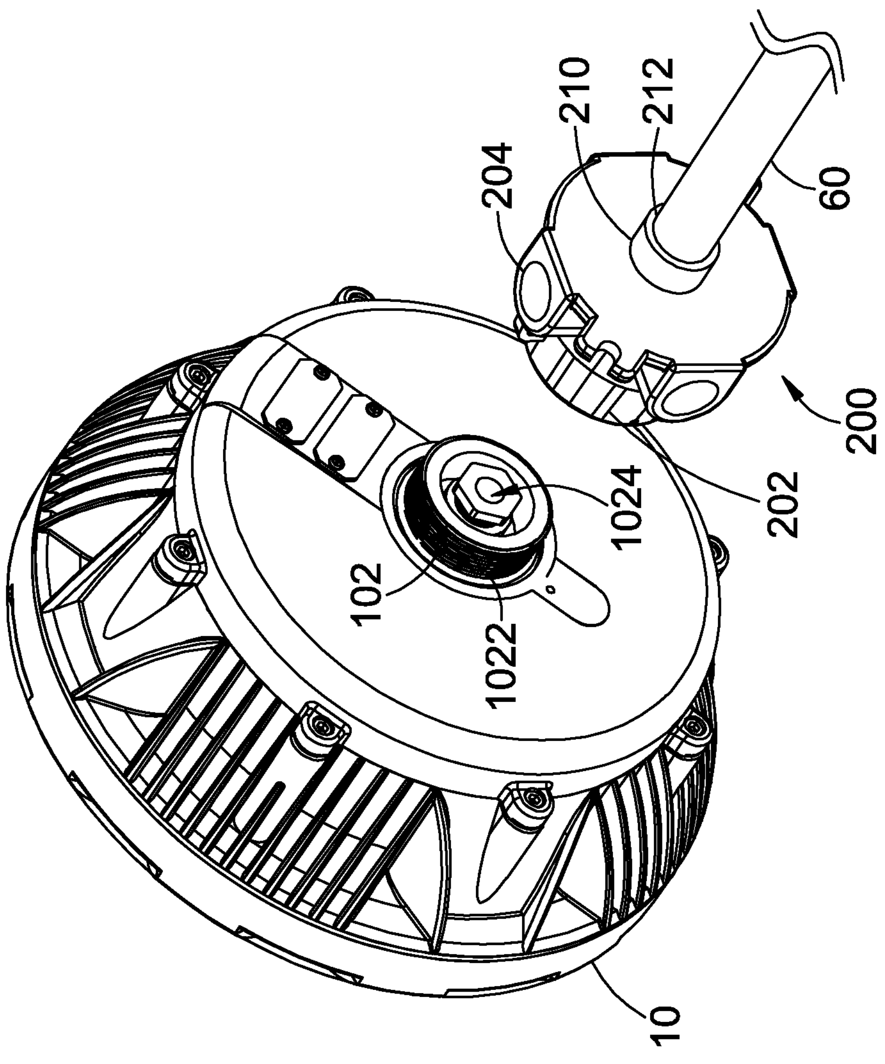
FIG. 10 shows a schematic diagram of the fixing structure according to the fourth embodiment of the present invention.

Please refer again to FIG. 4, as well as referring to FIG. 10. FIG. 10 shows a schematic diagram of the fixing structure according to the fourth embodiment of the present invention. As shown in the figures, according to the present embodiment, a third fixing member 210 is disposed on the installation base 200. The third fixing member 210 extends upward along the other side of the installation base 200. A fourth opening 212 is disposed on the third fixing member 210. The fourth opening 212 is used for disposing a hanging pipe 60. While installing, the fourth opening 212 of the third fixing member 210 of the installation base 200 is put around the hanging pipe 60. Next, the external thread 1022 is disposed to the internal thread 2022 by screwing for fixing and installing the lamp. The present invention can meet different installation requirements and realize hanging of lamps. The other structures according to the present embodiment are basically identical to those according to the first embodiment. Hence, the details will not be described again.

To sum up, the present invention provides a lamp structure, which disposes the external thread 1022 on the first fixing member 102 of the top case 10 and disposes the internal thread 2022 on the second fixing member 202 of the installation base 200. While installing, the installation base 200 is first disposed to the object, the wall, or the ceiling. Then the top case 10 is disposed to the installation bae 200 by screwing and thus finishing the installation of a stable lamp structure. Next, By disposing the fixing frame 112 on the installation base 200, disposing the support arm 208 on one side of the installation base 200, or disposing the fourth opening 212 on the other side of the installation base and connecting to the hanging pipe 60, the present invention can realize installation for various lamp structures and meet different installation requirements. To replace the lamp, just disassemble the top case 10 and replace it. It is not required to disassemble the installation base 200. Thereby, the replacement becomes faster and more convenient and hence saving costs.

Figure 11:
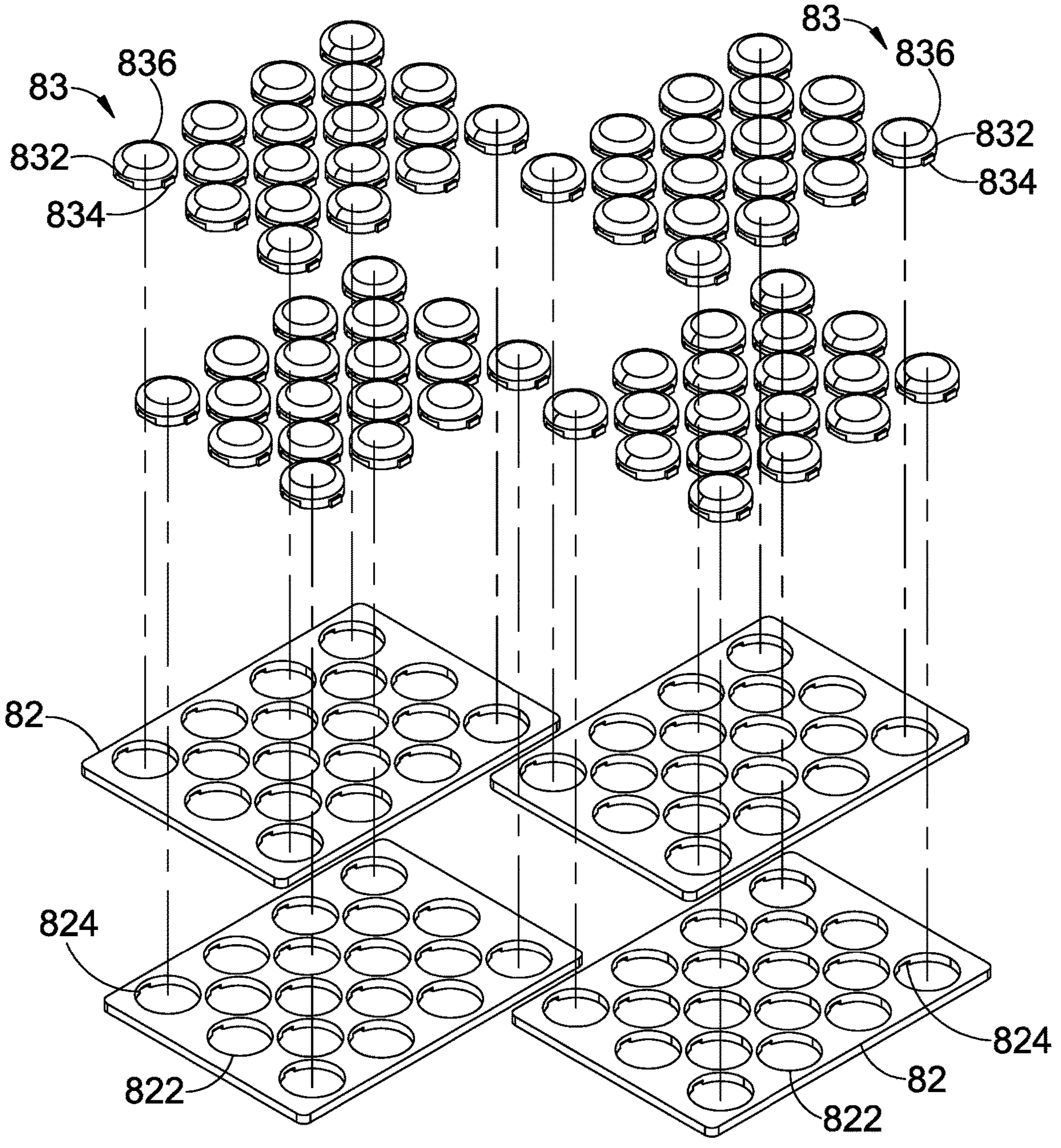
FIG. 11 shows an exploded view of the lens structure according to an embodiment of the present invention.
Figure 12:
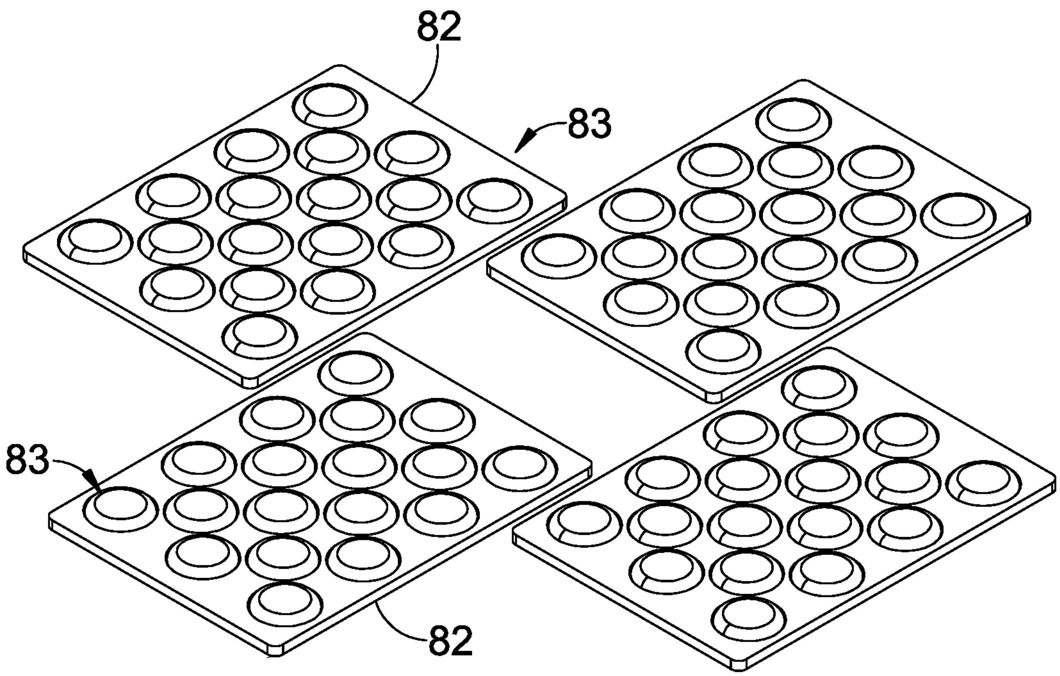
FIG. 12 shows a schematic diagram of the lens structure according to an embodiment of the present invention.

Please refer to FIG. 11 and FIG. 12. FIG. 11 shows an exploded view of the lens structure according to an embodiment of the present invention. FIG. 12 shows a schematic diagram of the lens structure according to an embodiment of the present invention. As shown in the figure, the present invention provides a lamp structure 1, which comprises one or more first base board 82 and one or more lens member 83. The one or more first base board 82 is identical to the base board 52 and the base board 108 as described above.

One or more hole 822 is disposed on the one or more first base board 82. When the number of the one or more hole 822 is plural, the holes 822 are spaced at a distance. According to the present embodiment, a plurality of holes 822 are adopted. One or more slot 824 is disposed on one side of the one or more hole 822. To elaborate, the one or more slot 824 is disposed on the one or more first base board 82 and located on one side inside the one or more hole 822. In addition, the one or more lens member 83 is disposed on the one or more first base board 82 and covers the one or more hole 822. One or more inserting member 834 is disposed on one side of the one or more lens member 83. The one or more inserting member 834 is connected inside the one or more slot 824 correspondingly. The one or more lens member 83 covers the one or more hole 822. Besides, the one or more lens member 83 includes an extension part 832 and a lens part 836. The extension part 832 is disposed below the lens part 836. The one or more inserting member 834 is disposed one side of the extension part 832. The extension part 832 is located inside the one or more hole 822 such that the one or more lens member 83 can be connected with the one or more inserting member 834 via the one or more slot 824 and hence fixing the one or more lens member 83 to the one or more first base board 82.

In the above structure, the one or more inserting member 834 is jointed to the one or more slot 824 correspondingly. In other words, the one or more inserting member 834 is inserted into the one or more slot 824 such that the one or more lens member 83 can be fixed to the one or more first base board 82. In addition, the one or more lens member 83 covers the one or more hole 822. When the one or more first base board 82 is shaken or the one or more lens member 83 experiences thermal expansion, the one or more lens member 83 can be fixed firmly to the one or more first base board 82 and thus reducing the risk of falloff for the one or more lens member 83.

Figure 13:
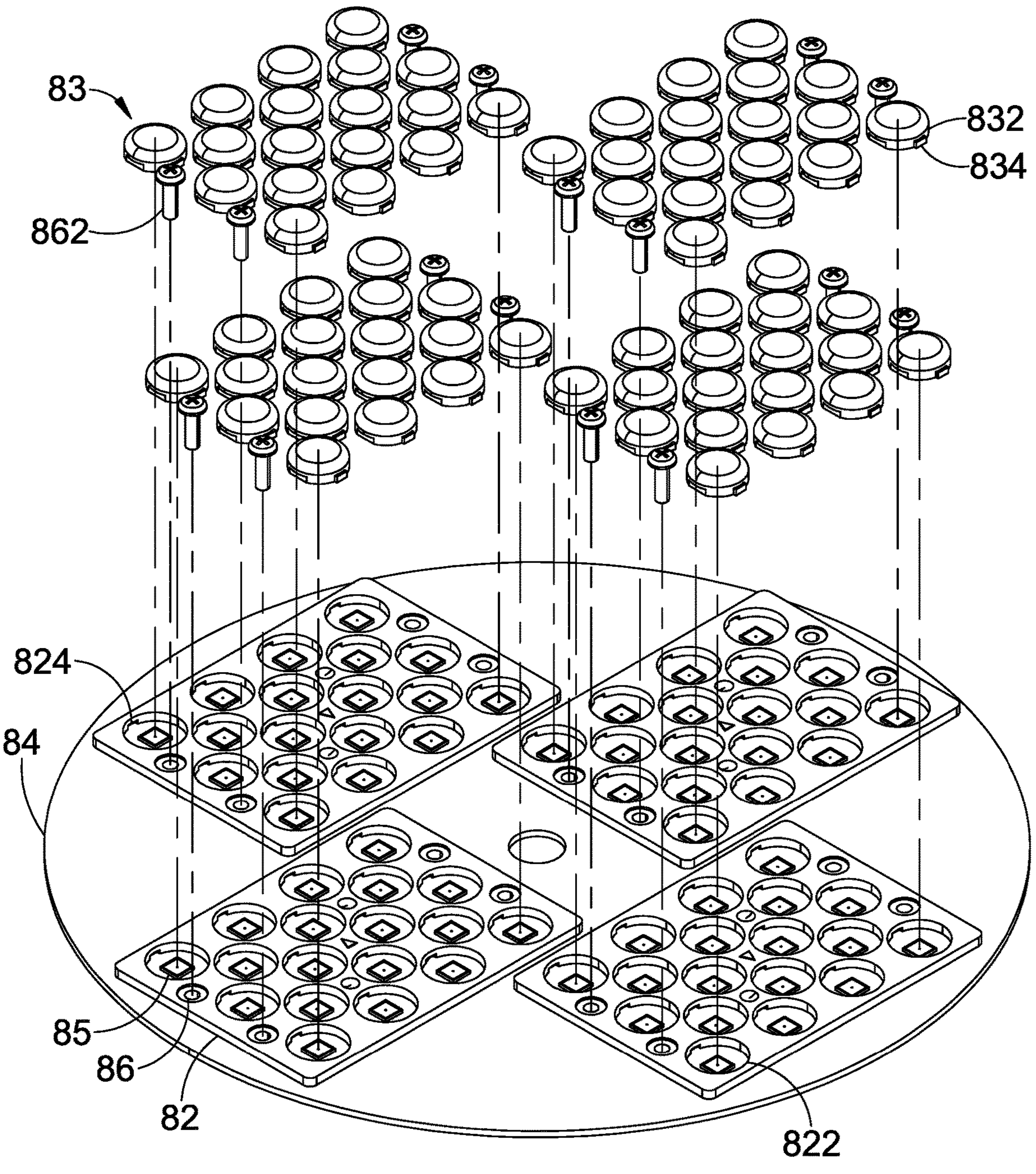
FIG. 13 shows an exploded view of the lens structure according to another embodiment of the present invention.
Figure 14:
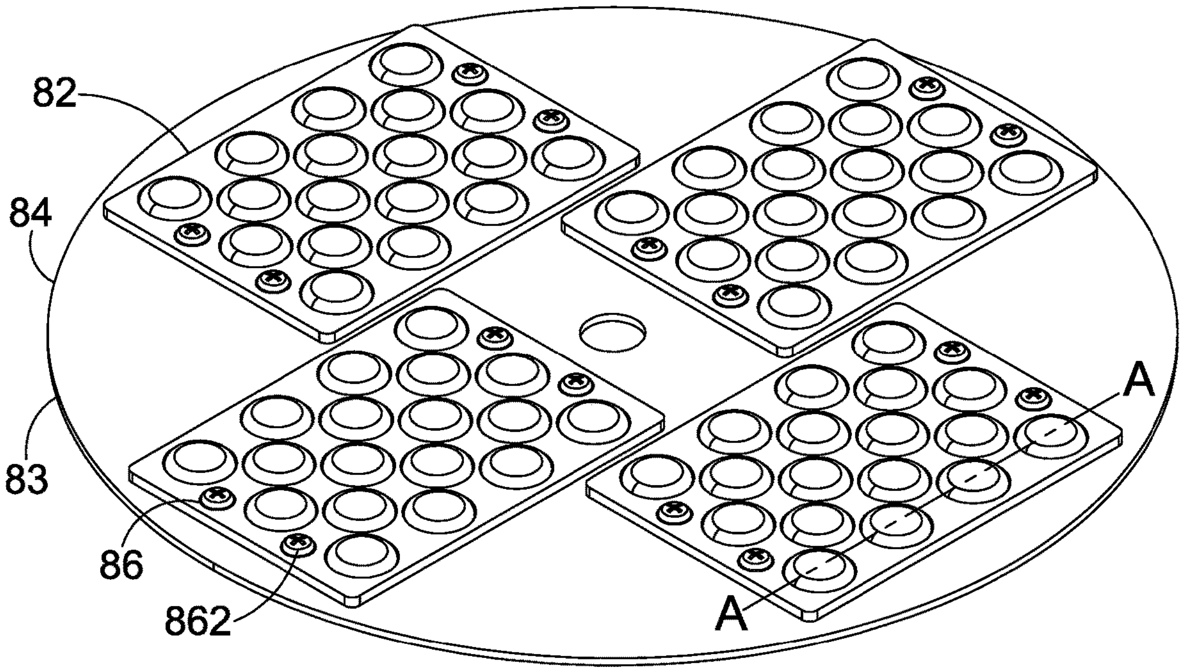
FIG. 14 shows a schematic diagram of the lens structure according to another embodiment of the present invention.

Next, please refer to FIG. 13 and FIG. 14. FIG. 13 shows an exploded view of the lens structure according to another embodiment of the present invention. FIG. 14 shows a schematic diagram of the lens structure according to another embodiment of the present invention. As shown in the figures, compared to the previous embodiment, the present embodiment further comprises a second base board 84 and one or more light-emitting device 85, making its structure identical to the one according to the previous embodiment. Hence, the details will not be described again. Besides, the one or more light-emitting device 85 is identical to the one or more light-emitting device 50 as described above.

The second base board 84 is disposed below the one or more first base board 82. In other words, the one or more first base board 82 is disposed on the second base board 84. When the number of the one or more first base board 82 is plural, the one or more first base board 82 is arranged on the second base board 84 in a matrix. The one or more light-emitting device 85 is disposed on the second base board 84 and connected electrically to the second base board 84. Besides, the one or more light-emitting device 85 is located inside the one or more hole 822. Namely, each of the holes 822 corresponds to one of the light-emitting device 85, respectively. Moreover, each of the one or more hole 822 corresponds to each of the one or more lens member 83. The light-emitting device 85 is a light-emitting device (LED).

The present invention further comprises one or more fixing hole 86 and one or more fixing member 862. The one or more fixing hole 86 is disposed on the one or more first base board 82 and extends to the second base board 84. In addition, the one or more fixing hole 86 can penetrate the one or more first base board 82 and the second base board 84. Alternatively, the one or more fixing hole 86 can penetrate the one or more first base board 82 to the inside the second base board 84. The one or more fixing member 862 is disposed on the one or more fixing hole 86. To elaborate, each of the one or more fixing hole 86 corresponds to each of the one or more fixing member 862. The one or more fixing member 862 is used for fixing the one or more first base board 82 to the second base board 84. According to the present embodiment, the one or more fixing hole 86 is a threaded hole; the one or more fixing member 862 is a screw. The one or more fixing member 862 is screwed to the one or more fixing hole 86 such that the one or more first base board 82 can be fixed to the second base board 84.

Figure 15:
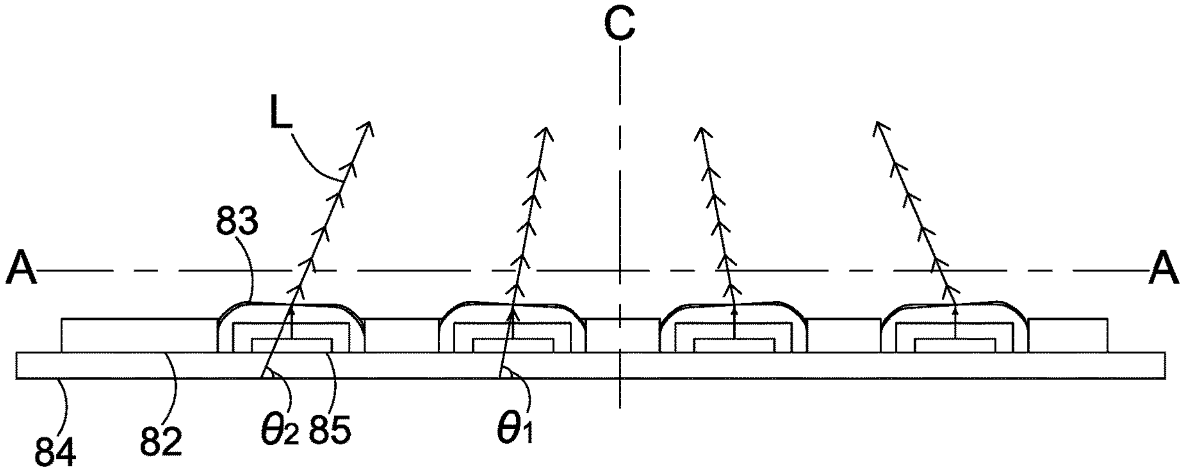
FIG. 15 shows a cross-sectional view of the lens structure according to another embodiment of the present invention.

Please refer to FIG. 15, which shows a cross-sectional view of the lens structure according to another embodiment of the present invention. As shown in the figure, FIG. 15 is a cross-sectional view of FIG. 14 along AA. When the light-emitting device 85 emits light L, the light L passes through the slot 83 and is refracted by the one or more lens member 83 and focused at a point outside the one or more lens member 83. To elaborate, the one or more slot 824 and the one or more inserting member 834 can be connected pivotally. The number of the one or more slot 824 can be one or two. The number of the one or more inserting member 834 is one or two, corresponding to the number of the one or more slot 824. The one or more lens member 83 forms a first angle $\theta_1$ with resect to the one or more first base board 82. According to the embodiment in FIG. 5, four lens members 83 are taken as an example for description. To adjust the light path of the light L through the one or more lens member 83 and enable the light L to be focused on a central imaginary line C of the four lens members 83, the lens members 83 on one side of the central imaginary line C should be adjusted to form the first angle $\theta_1$ and a second angle $\theta_2$ with respect to the one or more first base board 82, respectively, such that the light L passing though the one or more lens members 83 can be focused on the central imaginary line C, respectively. The adjustment method for the other two lens members 83 on the other side of the central imaginary line C is the same as the first two. Hence, the details will not be repeated. After adjusting the angles of the one or more lens member 83 with respect to the one or more first base board 82, the light L can be focused at one point and thus achieving the effect of focusing.

According to the present embodiment, when the one or more light-emitting device 85 emit light and the light passes through the one or more lens member 83, the one or more lens member 83 will absorb heat gradually sue to the passing of light. The one or more inserting member 834 is disposed below the one or more lens member 83 and inserted in the one or more slot 824. As the one or more lens member 83 deforms owing to the heat, the one or more lens member 83 will not fall off the one or more first base board 82 because the one or more inserting member 834 is inserted in the one or more slot 824. Thereby, the one or more lens member 83 can be disposed on the one or more first base board more securely. Moreover, the one or more first base board 82 is fixed to the second base board 84 through the one or more fixing hole 86 and the one or more fixing member 862. When the one or more first base board 82 or the second base board 84 is shaken, the one or more first base board 92 can still be fixed firmly on the second base board 84. Besides, the one or more lens member 83 cane be adjusted to form the first angle $\theta_1$ or the second angle $\theta_2$ with respect to the one or more first base board 82 and hence controlling the angle of the light passing though the lenses.

To sum up, the present invention provides a lamp structure. One or more inserting member is disposed on one side of one or more lens member. The one or more lens member is disposed on one or more hole of one or more first base board. One or more slot is disposed on one side in the one or more hole. The one or more inserting member is disposed in the one or more slot correspondingly such that the one or more lens member can be disposed in the one or more slot by means of the one or more inserting member. Thereby, the one or more lens member can be fixed on the one or more first base board. When the first base board is shaken or the one or more lens member is deformed due to heat, the one or lens member can be prevented from falling off the one or more first base board. In addition, the one or more lens member forms the first angle with respect to the one or more first base board and hence further controlling the angle of the light passing through the lenses. When the number of the one or more slot is two, the one or more lens member can be adjusted to form the first angle and the second angle with respect to the one or more first base board, respectively, such that the light emerged from the one or more lens member can be focused at one point and achieving the effect focusing.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A lamp structure, comprising:

a top case including a hollow member disposed on a top surface of said top case, a first projective member disposed inside of said hollow member such as to define a first tank between said first projective member and said hollow member, a first elastic ring having a first hole and being disposed on an inner side of said first projective member, a first latch member inserted into said first projective member and pressing the top of said first elastic ring, said first latch member including a first penetrating hole communicating with said first hole of said first elastic ring; and a bottom case disposed below said top case, said bottom case defining a second tank between said top case and said bottom case and communicating with said first projective member, said bottom case including a second projective member disposed on a top surface of said bottom case and located inside said second tank, a second elastic ring having a second hole and being disposed on an inner side of said second projective member, a second latch member inserted into said second projective member and pressing the top of said second elastic ring, said second latch member including a second penetrating hole communicating with said second tank and said second hole of said second elastic ring.

2. The lamp structure of claim 1, and further comprising an electrical apparatus disposed on the top of said bottom case and located on one side of said second projective member.

3. The lamp structure of claim 1, wherein a waterproof washer is disposed between said top case and said bottom case.

4. The lamp structure of claim 1, wherein a first height of said hollow member is greater than a second height of said first projective member; and a third height of said bottom case is greater than a fourth height of said second projective member.

5. The lamp structure of claim 1, and further comprising one or more light-emitting devices disposed below said bottom case, and a lampshade disposed below said bottom case and above said one or more light-emitting devices.

6. The lamp structure of claim 5, further comprising a wire, wherein said wire passes through said first penetrating hole and said first hole to said second water tank, then through said second penetrating hole and said second hole, and is connected to said one or more light-emitting devices.

* * * * *